United States Patent
Luo

(10) Patent No.: US 11,405,604 B2
(45) Date of Patent: Aug. 2, 2022

(54) 3D DISPLAY DEVICE AND MANUFACTURING METHOD THEREOF

(71) Applicant: Wuhan China Star Optoelectronics Technology Co., Ltd., Wuhan (CN)

(72) Inventor: Chengzhi Luo, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/630,474

(22) PCT Filed: Nov. 7, 2019

(86) PCT No.: PCT/CN2019/116138
§ 371 (c)(1),
(2) Date: Jan. 13, 2020

(87) PCT Pub. No.: WO2020/238031
PCT Pub. Date: Dec. 3, 2020

(65) Prior Publication Data
US 2022/0078399 A1   Mar. 10, 2022

(30) Foreign Application Priority Data

May 27, 2019 (CN) .......................... 201910443379.6

(51) Int. Cl.
*H04N 13/312* (2018.01)
*G02F 1/13363* (2006.01)
*G02F 1/1335* (2006.01)

(52) U.S. Cl.
CPC ..... *H04N 13/312* (2018.05); *G02F 1/133514* (2013.01); *G02F 1/133638* (2021.01)

(58) Field of Classification Search
CPC ............ H04N 13/312; G02F 1/133638; G02F 1/133514
(Continued)

(56) References Cited

U.S. PATENT DOCUMENTS

2006/0023143 A1* 2/2006 Lee ...................... H04N 13/356
348/E13.044
2012/0162552 A1 6/2012 Lee
(Continued)

FOREIGN PATENT DOCUMENTS

CN          1727957 A     2/2006
CN          104950497 A   9/2015
(Continued)

*Primary Examiner* — Nathanael R Briggs
*Assistant Examiner* — William D Peterson
(74) *Attorney, Agent, or Firm* — Nathan & Associates; Menachem Nathan

(57) ABSTRACT

A 3D display device and a manufacturing method thereof are provided. Metal nanowires perpendicular to each other are provided at the TFT glass substrate side and the CF glass substrate side. The metal nanowires can realize inherent function of polarizers at the TFT glass substrate side and the CF glass substrate side, and can also make the emitted light into stripe-shaped polarized light perpendicular to each other. Therefore, the polarizers, the λ/2 phase retarder with stripes, and the polarizers with stripes and perpendicular polarization that are originally at the TFT glass substrate side and the CF glass substrate side in a 3D polarizer display are excluded. The thickness of the 3D display device is made thinner. Moreover, according to the structural design, polarization effect is not limited by wavelength range of the light. Therefore, 3D stereoscopic display effect is greatly enhanced.

10 Claims, 3 Drawing Sheets

(58) Field of Classification Search
USPC .......................................................... 359/462
See application file for complete search history.

(56) References Cited

U.S. PATENT DOCUMENTS

| | | |
|---|---|---|
| 2012/0162553 A1 | 6/2012 | Lee |
| 2017/0371202 A1 | 12/2017 | He et al. |
| 2019/0235321 A1* | 8/2019 | Zhou .................. G02F 1/13363 |

FOREIGN PATENT DOCUMENTS

| | | |
|---|---|---|
| CN | 107991783 A | 5/2018 |
| CN | 108198841 A | 6/2018 |
| CN | 109445012 A | 3/2019 |
| CN | 109557713 A | 4/2019 |
| CN | 109917581 A | 6/2019 |
| CN | 110058457 A | 7/2019 |
| JP | H10153771 A | 6/1998 |
| JP | 2016004143 A | 1/2016 |
| JP | 2018049138 A | 3/2018 |

* cited by examiner

3D DISPLAY DEVICE AND MANUFACTURING METHOD THEREOF

FIELD OF THE DISCLOSURE

The present invention relates to display technologies, and more particularly to a 3D display device and a manufacturing method thereof.

DESCRIPTION OF RELATED ARTS 3D display technology is a technique that uses a series of optical methods to generate parallax for people's left and right eyes, thereby perceiving different images to establish stereoscopic images in the brain. Compared to ordinary 2D display, 3D display can make the picture more vivid, and the images are no longer restricted to a screen plane, as if it can walk out of the screen, so that the audience has an immersive experience.

Among different 3D display technologies, 3D polarizer display technology has been widely used due to its low cost and excellent stereoscopic image effect. The 3D polarizer display decomposes original images by utilization of "vibration direction" of the light. More specifically, images are divided into two groups of images with vertically polarized light and horizontally polarized light by using a display device, and then a pair of 3D glasses, the left and right pieces of which are equipped with polarizers having different polarization directions, is utilized for the left and right eyes of a user to perceive the two groups of images, which are synthesized as stereoscopic images in the brain.

In general, the principle of the 3D polarizer display is illustrated as below. After polarized light emitted from a polarizer disposed on a color filter substrate passes through a $\lambda/2$ phase retarder with stripes, a part of the polarized light changes its polarization state, and then the light passes through a polarizer with stripes and perpendicular polarization to be changed to polarized light with perpendicular polarization, which are then received by the right and left pieces of glasses, respectively, to form 3D images in the brain.

However, to achieve this purpose, it needs to use the $\lambda/2$ phase retarder with stripes and the polarizer with stripes and perpendicular polarization. Also, there is a polarizer originally disposed on the color filter substrate. The results in a thick display device, and the structure of the display device is extremely complicated. In addition, the wavelength range of polarized light emitted from the polarizer disposed on the color filter substrate spans a lot, and the $\lambda/2$ phase retarder with stripes cannot change the polarization of all the emitted light. Obviously, the existing 3D display technology still has many defects.

Therefore, there is a need to provide a 3D display device and a manufacturing method thereof, for solving the problems of the existing arts.

Technical Problems

The objective of the present invention is to provide a 3D display device and a manufacturing method thereof, for solving the technical problems that display devices are too thick and the wavelength of light is restricted in the existing arts.

TECHNICAL SOLUTIONS

To solve above technical problems, the present invention provides a 3D display device including a thin-film transistor (TFT) glass substrate, a color filter (CF) glass substrate, a liquid crystal layer and a $\lambda/4$ phase retarder.

At the back side, the TFT glass substrate has a plurality of first regions and a plurality of second regions that are interlaced with and parallel to each other. The first regions are provided with a plurality of metal nanowires with a same pitch, extending along a first direction. The second regions are provided with a plurality of metal nanowires with a same pitch, extending along a second direction. The first direction is perpendicular to the second direction. At a front side, the TFT glass substrate is provided with a first alignment layer, a top surface of which has a trench pattern having an extending direction as the same as that of the metal nanowires at the back side of the TFT glass substrate.

A back side, the CF glass substrate has a plurality of third regions and a plurality of fourth regions that are interlaced with and parallel to each other. The third regions are provided with a plurality of metal nanowires with a same pitch, extending along the second direction. The fourth regions are provided with a plurality of metal nanowires with a same pitch, extending along the first direction. At a front side, the CF glass substrate is provided with a second alignment layer, a top surface of which has a trench pattern having an extending direction as the same as that of the metal nanowires at the back side of the CF glass substrate. The front side of the CF glass substrate is disposed opposite to the front side of the TFT glass substrate such that the first regions correspond to the third regions and the second regions correspond to the fourth regions.

The liquid crystal layer is disposed between the TFT glass substrate and the CF glass substrates.

The $\lambda/4$ phase retarder is attached to the metal nanowires at the back side of the CF glass substrate, where $\lambda$ is the wavelength of light passing through the 3D display device.

In the 3D display device of the present invention, the material of the metal nanowires in the first regions, the second regions, the third regions and the fourth regions is aluminum, silver or copper.

In the 3D display device of the present invention, the width of the metal nanowires in the first regions, the second regions, the third regions and the fourth regions ranges from 100 to 300 nm.

In the 3D display device of the present invention, the pitch of the metal nanowires in the first regions, the second regions, the third regions and the fourth regions ranges from 100 to 300 nm.

In the 3D display device of the present invention, the thickness of the metal nanowires in the first regions, the second regions, the third regions and the fourth regions ranges from 20 to 500 nm.

The present invention further provides a method for manufacturing a 3D display device, including:

providing a thin-film transistor (TFT) glass substrate, a back side of which has a plurality of first regions and a plurality of second regions that are interlaced with and parallel to each other;

forming a plurality of metal nanowires with a same pitch, extending along a first direction, in the first regions, and forming a plurality of metal nanowires with a same pitch, extending along a second direction, in the second regions, the first direction perpendicular to the second direction;

forming a first alignment layer at a front side of the TFT glass substrate, a top surface of the first alignment layer having a trench pattern having an extending direction as the same as that of the metal nanowires at the back side of the TFT glass substrate;

providing a color filter (CF) glass substrate, a back side of which has a plurality of third regions and a plurality of fourth regions that are interlaced with and parallel to each other;

forming a plurality of metal nanowires with a same pitch, extending along the second direction, in the third regions, and forming a plurality of metal nanowires with a same pitch, extending along the first direction, in the fourth regions;

forming a second alignment layer at a front side of the CF glass substrate, a top surface of the second alignment layer having a trench pattern having an extending direction as the same as that of the metal nanowires at the back side of the CF glass substrate;

attaching the CF glass substrate to the TFT glass substrate such that the front side of the CF glass substrate is opposite to the front side of the TFT glass substrate, and the first regions correspond to the third regions and the second regions correspond to the fourth regions;

disposing a liquid crystal layer between the TFT glass substrate and the CF glass substrate; and attaching a $\lambda/4$ phase retarder to the metal nanowires at the back side of the CF glass substrate, where $\lambda$ is the wavelength of light passing through the 3D display device.

In the method of the present invention, the material of the metal nanowires in the first regions, the second regions, the third regions and the fourth regions is aluminum, silver or copper.

In the method of the present invention, the width of the metal nanowires in the first regions, the second regions, the third regions and the fourth regions ranges from 100 to 300 nm.

In the method of the present invention, the pitch of the metal nanowires in the first regions, the second regions, the third regions and the fourth regions ranges from 100 to 300 nm.

In the method of the present invention, the thickness of the metal nanowires in the first regions, the second regions, the third regions and the fourth regions ranges from 20 to 500 nm.

BENEFICIAL EFFECTS

Compared to the existing arts, the present invention provides a 3D display device and a manufacturing method thereof. The present invention provides metal nanowires perpendicular to each other at the TFT glass substrate side and the CF glass substrate side. The metal nanowires can realize inherent function of polarizers at the TFT glass substrate side and the CF glass substrate side, and can also make the emitted light into stripe-shaped polarized light perpendicular to each other. Therefore, the present invention excludes the polarizers, the $\lambda/2$ phase retarder with stripes, and the polarizers with stripes and perpendicular polarization that are originally at the TFT glass substrate side and the CF glass substrate side in a 3D polarizer display. The thickness of the 3D display device is made thinner. Moreover, according to structural design of the present invention, polarization effect is not limited by wavelength range of the light. Therefore, the present invention greatly enhances 3D stereoscopic display effect.

DESCRIPTION OF EMBODIMENTS OF THE DISCLOSURE

The following descriptions for the respective embodiments are specific embodiments capable of being implemented for illustration of the present invention with referring to the appended figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention. In the appended figures, units with similar structures are indicated by same reference numbers.

The present invention provides a 3D display device, which will be described in detail below.

Figure 1:
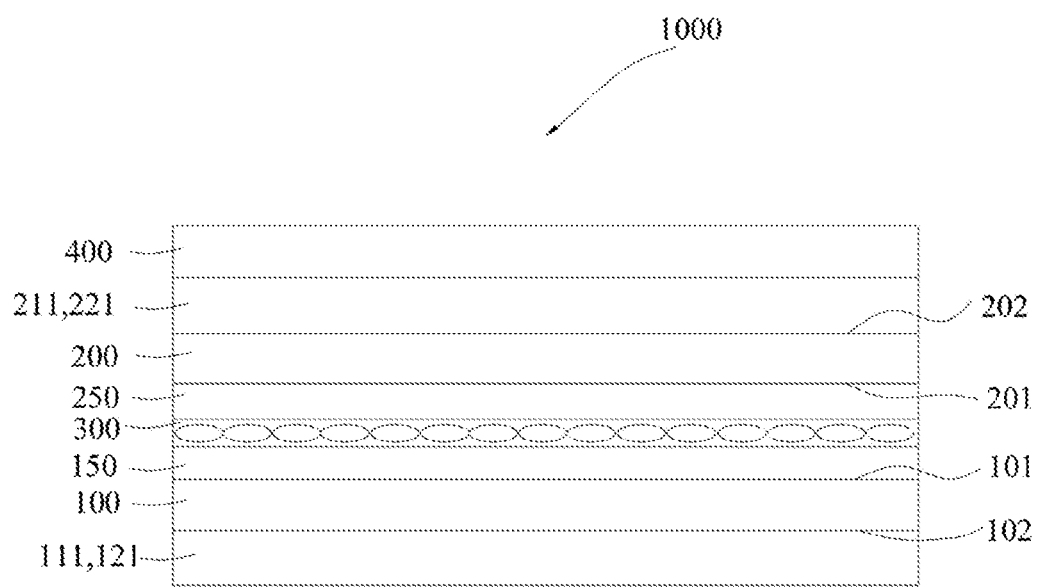
FIG. 1 is a structural schematic diagram illustrating a 3D display device according to an embodiment of the present invention.

FIG. 1 is a structural schematic diagram illustrating a 3D display device according to an embodiment of the present invention. The 3D display device 1000 includes a thin-film transistor (TFT) glass substrate 100, a color filter (CF) glass substrate 200, a liquid crystal layer 300 and a $\lambda/4$ phase retarder 400.

Figure 2A:
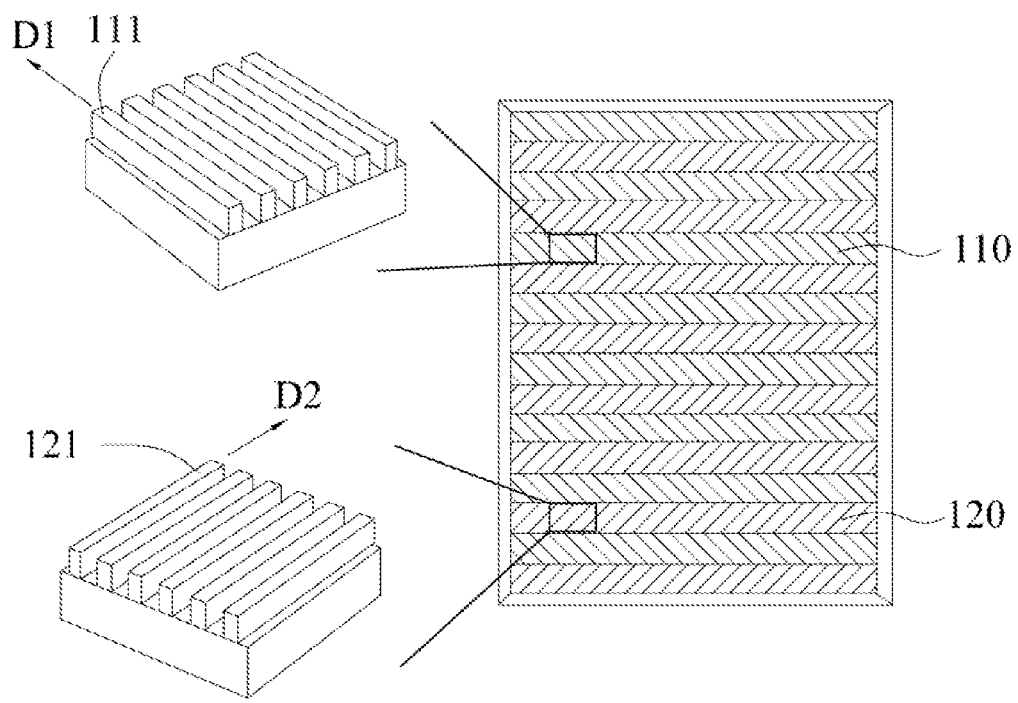
FIG. 2A is a top view of a TFT glass substrate at a back side according to an embodiment of the present invention.

FIG. 2A is a top view of a TFT glass substrate at a back side according to an embodiment of the present invention. At the back side 102, the TFT glass substrate 100 has a plurality of first regions 110 and a plurality of second regions 120 that are interlaced with and parallel to each other. The first regions 110 are provided with a plurality of metal nanowires 111 with a same pitch, extending along a first direction D1. The second regions 120 are provided with a plurality of metal nanowires 121 with a same pitch, extending along a second direction D2. The first direction D1 is perpendicular to the second direction D2. For example, if the first direction D1 is a horizontal direction, the second direction D2 is a vertical direction; alternatively, if the first direction D1 is a vertical direction, the second direction D2 is a horizontal direction.

Figure 2B:
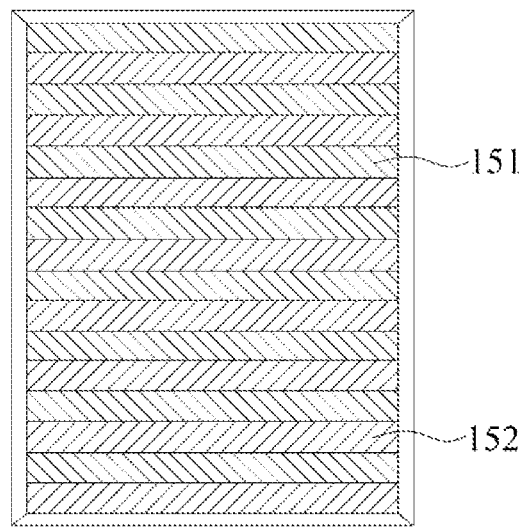
FIG. 2B is a top view of a TFT glass substrate at a front side according to an embodiment of the present invention.

FIG. 2B is a top view of a TFT glass substrate at a front side according to an embodiment of the present invention. At the front side 101, the TFT glass substrate 100 is provided with a first alignment layer 150, a top surface of which has a trench pattern having an extending direction as the same as that of the metal nanowires at the back side 102 of the TFT glass substrate 100. That is, the top surface of the first alignment layer 150 has a plurality of regions 151 and a plurality of regions 152. The regions 151 are provided with a plurality of trenches having an extending direction as the same as that of the metal nanowires 111 in the first regions 110. The regions 152 are provided with a plurality of trenches having an extending direction as the same as that of the metal nanowires 121 in the second regions 120. The trenches on the top surface of the first alignment layer 150 can control orientation of liquid crystal molecules.

Figure 3A:
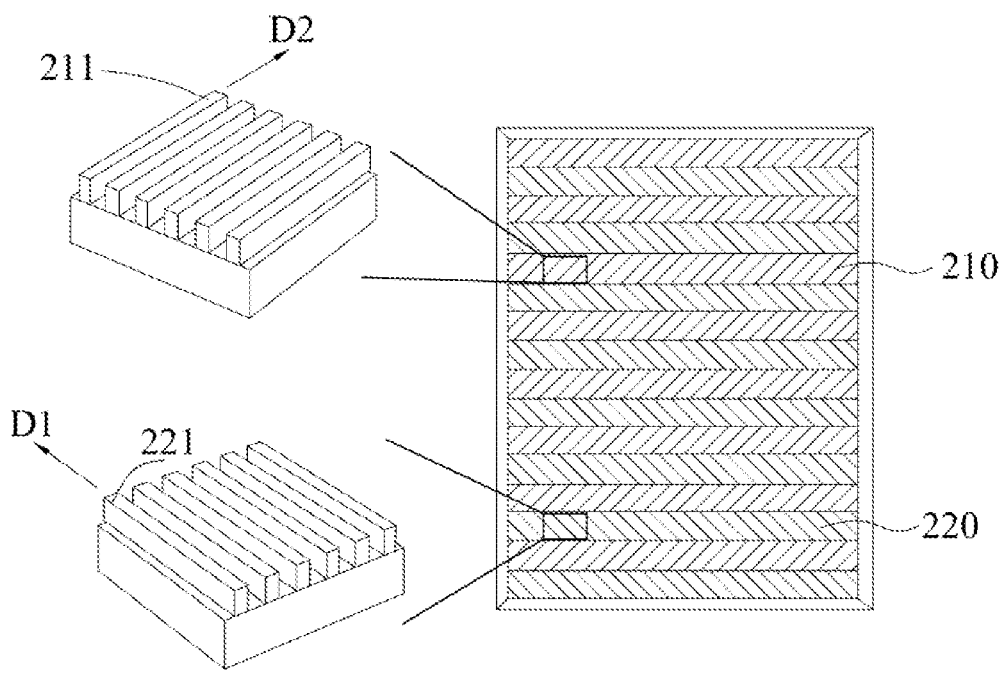
FIG. 3A is a top view of a CF glass substrate at a back side according to an embodiment of the present invention.

FIG. 3A is a top view of a CF glass substrate at a back side according to an embodiment of the present invention. At the back side 202, the CF glass substrate 200 has a plurality of third regions 210 and a plurality of fourth regions 220 that are interlaced with and parallel to each other. The third regions 210 are provided with a plurality of metal nanowires 211 with a same pitch, extending along the second direction D2. The fourth regions 220 are provided with a plurality of metal nanowires 221 with a same pitch, extending along the first direction D1. In other words, the metal nanowires on the CF glass substrate 200 are perpendicular to the metal nanowires at corresponding positions on the TFT glass substrate 100.

Figure 3B:
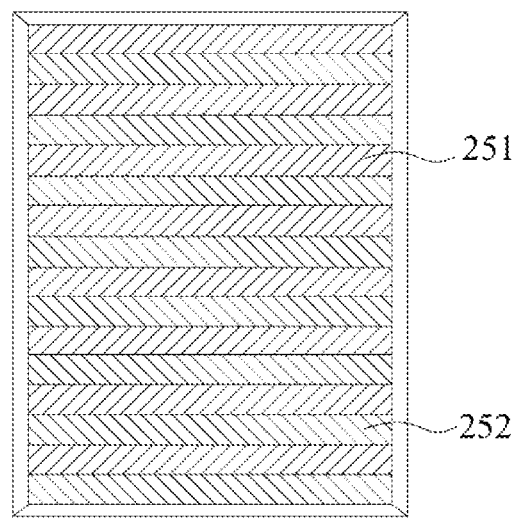
FIG. 3B is a top view of a CF glass substrate at a front side according to an embodiment of the present invention.

FIG. 3B is a top view of a CF glass substrate at a front side according to an embodiment of the present invention. At the front side, the CF glass substrate 200 is provided with a second alignment layer 250, a top surface of which has a trench pattern having an extending direction as the same as that of the metal nanowires at the back side 202 of the CF glass substrate 200. That is, the top surface of the second alignment layer 250 has a plurality of regions 251 and a plurality of regions 252. The regions 251 are provided with a plurality of trenches having an extending direction as the same as that of the metal nanowires 211 in the third regions 210. The regions 252 are provided with a plurality of trenches having an extending direction as the same as that of the metal nanowires 221 in the fourth regions 220. The trenches on the top surface of the second alignment layer 250 can control orientation of liquid crystal molecules.

The front side 201 of the CF glass substrate 200 is disposed opposite to the front side 101 of the TFT glass substrate 100, as shown in FIG. 1. This can make the first regions 110 correspond to the third regions 210 and make the second regions 120 correspond to the fourth regions 220.

The liquid crystal layer 300 is disposed between the TFT glass substrate 100 and the CF glass substrate 200.

The λ/4 phase retarder 400 is attached to the metal nanowires at the back side 202 of the CF glass substrate 200, where λ is the wavelength of light passing through the 3D display device.

In an embodiment of the present invention, the material of the metal nanowires in the first regions, the second regions, the third regions and the fourth regions is aluminum, silver or copper. The width of the metal nanowires in the first regions, the second regions, the third regions and the fourth regions ranges from 100 to 300 nm. The pitch of the metal nanowires in the first regions, the second regions, the third regions and the fourth regions ranges from 100 to 300 nm. The thickness of the metal nanowires in the first regions, the second regions, the third regions and the fourth regions ranges from 20 to 500 nm.

The present invention provides metal nanowires perpendicular to each other at the TFT glass substrate side and the CF glass substrate side. The metal nanowires can realize inherent function of polarizers at the TFT glass substrate side and the CF glass substrate side, and can also make the emitted light into stripe-shaped polarized light perpendicular to each other. Therefore, the present invention excludes the polarizers, the 212 phase retarder with stripes, and the polarizers with stripes and perpendicular polarization that are originally at the TFT glass substrate side and the CF glass substrate side in a 3D polarizer display. The thickness of the 3D display device is made thinner. Moreover, according to structural design of the present invention, polarization effect is not limited by wavelength range of the light. Therefore, the present invention greatly enhances 3D stereoscopic display effect.

The present invention further provides a method for manufacturing a 3D display device. The method includes the following steps.

In Step S100, a TFT glass substrate 100 is provided. At the back side 102, the TFT glass substrate 100 has a plurality of first regions 110 and a plurality of second regions 120 that are interlaced with and parallel to each other.

In Step S200, a plurality of metal nanowires 111 with a same pitch, extending along a first direction D1, are formed in the first regions 110, and a plurality of metal nanowires 121 with a same pitch, extending along a second direction D2, are formed in the second regions 120. The first direction D1 is perpendicular to the second direction D2.

Specifically, a metal layer is first deposited at the back side 102 of the TFT glass substrate 100. The material of the metal layer can be aluminum, silver or copper. Then, the metal layer is patterned by lithography and etching techniques to form the metal nanowires 111 and the metal nanowires 121, extending directions of which are perpendicular to each other.

The width of the metal nanowires in the first regions and the second regions ranges from 100 to 300 nm. The pitch of the metal nanowires in the first regions and the second regions ranges from 100 to 300 nm. The thickness of the metal nanowires in the first regions and the second regions ranges from 20 to 500 nm.

In Step S300, a first alignment layer 150 is formed at a front side 101 of the TFT glass substrate 100, a top surface of the first alignment layer 150 has a trench pattern having an extending direction as the same as that of the metal nanowires 111, 121 at the back side 102 of the TFT glass substrate 100.

Specifically, polyimide (PI) solution is coated at the front side 101 of the TFT glass substrate 100, and then is cured by ultraviolet exposure with a mask to form the trench pattern having an extending direction as the same as that of the metal nanowires 111, 121 at the back side 102 of the TFT glass substrate 100.

That is, the top surface of the first alignment layer 150 has a plurality of regions 151 and a plurality of regions 152. The regions 151 are provided with a plurality of trenches having an extending direction as the same as that of the metal nanowires 111 in the first regions 110. The regions 152 are provided with a plurality of trenches having an extending direction as the same as that of the metal nanowires 121 in the second regions 120. The trenches on the top surface of the first alignment layer 150 can control orientation of liquid crystal molecules.

In Step S400, a CF glass substrate 200 is provided. At the back side 202, the CF glass substrate 200 has a plurality of third regions 210 and a plurality of fourth regions 220 that are interlaced with and parallel to each other.

In Step S500, a plurality of metal nanowires 211 with a same pitch, extending along the second direction D2, are formed in the third regions 210, and a plurality of metal nanowires 221 with a same pitch, extending along the first direction D1, are formed in the fourth regions 220.

Specifically, a metal layer is first deposited at the back side 202 of the CF glass substrate 200. The material of the metal layer can be aluminum, silver or copper. Then, the metal layer is patterned by lithography and etching techniques to form the metal nanowires 211 and the metal nanowires 221, extending directions of which are perpendicular to each other.

The width of the metal nanowires in the third regions and the fourth regions ranges from 100 to 300 nm. The pitch of the metal nanowires in the third regions and the fourth regions ranges from 100 to 300 nm. The thickness of the metal nanowires in the third regions and the fourth regions ranges from 20 to 500 nm.

In Step S600, a second alignment layer 250 is formed at a front side 201 of the CF glass substrate 200, a top surface of the second alignment layer 250 has a trench pattern having an extending direction as the same as that of the metal nanowires 211, 221 at the back side 202 of the CF glass substrate 200.

Specifically, polyimide (PI) solution is coated at the front side 201 of the CF glass substrate 200, and then is cured by ultraviolet exposure with a mask to form the trench pattern having an extending direction as the same as that of the metal nanowires 211, 221 at the back side 202 of the CF glass substrate 200.

That is, the top surface of the second alignment layer 250 has a plurality of regions 251 and a plurality of regions 252. The regions 251 are provided with a plurality of trenches having an extending direction as the same as that of the metal nanowires 211 in the third regions 210. The regions 252 are provided with a plurality of trenches having an extending direction as the same as that of the metal nanowires 221 in the fourth regions 220. The trenches on the top surface of the second alignment layer 250 can control orientation of liquid crystal molecules.

In Step S700, the CF glass substrate 200 is attached to the TFT glass substrate 100 such that the front side 201 of the CF glass substrate 200 is opposite to the front side 101 of the TFT glass substrate 100, and the first regions 110 correspond to the third regions 210 and the second regions 120 correspond to the fourth regions 220. In other words, the metal nanowires on the CF glass substrate 200 are perpendicular to the metal nanowires at corresponding positions on the TFT glass substrate 100.

In Step S800, a liquid crystal layer 300 is disposed between the TFT glass substrate 100 and the CF glass substrate 200.

Specifically, the CF glass substrate 200 and the TFT glass substrate 100 may be attached to each other, and then liquid crystal molecules are injected into a room confined by the CF glass substrate 200 and the TFT glass substrate 100. Alternatively, one drop filling (ODF) may be utilized to form the liquid crystal layer 300. That is, liquid crystal material drops onto one glass substrate and then the other glass substrate is attached to the glass substrate onto which the liquid crystal material is dropped.

In Step S900, finally, a λ/4 phase retarder 400 is attached to the metal nanowires 211, 221 at the back side 202 of the CF glass substrate 200, where λ is the wavelength of light passing through the 3D display device 1000.

In an embodiment of the present invention, the material of the metal nanowires in the first regions, the second regions, the third regions and the fourth regions is aluminum, silver or copper. The width of the metal nanowires in the first regions, the second regions, the third regions and the fourth regions ranges from 100 to 300 nm. The pitch of the metal nanowires in the first regions, the second regions, the third regions and the fourth regions ranges from 100 to 300 nm. The thickness of the metal nanowires in the first regions, the second regions, the third regions and the fourth regions ranges from 20 to 500 nm.

Compared to the existing arts, the present invention provides a 3D display device and a manufacturing method thereof. The present invention provides metal nanowires perpendicular to each other at the TFT glass substrate side and the CF glass substrate side. The metal nanowires can realize inherent function of polarizers at the TFT glass substrate side and the CF glass substrate side, and can also make the emitted light into stripe-shaped polarized light perpendicular to each other. Therefore, the present invention excludes the polarizers, the λ/2 phase retarder with stripes, and the polarizers with stripes and perpendicular polarization that are originally at the TFT glass substrate side and the CF glass substrate side in a 3D polarizer display. The thickness of the 3D display device is made thinner. Moreover, according to structural design of the present invention, polarization effect is not limited by wavelength range of the light. Therefore, the present invention greatly enhances 3D stereoscopic display effect.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

The invention claimed is:

1. A 3D display device, comprising:

a thin-film transistor (TFT) glass substrate, a back side of which has a plurality of first regions and a plurality of second regions that are interlaced with and parallel to each other, the first regions provided with a plurality of metal nanowires with a same pitch, extending along a first direction, the second regions provided with a plurality of metal nanowires with a same pitch, extending along a second direction, the first direction perpendicular to the second direction; at a front side, the TFT glass substrate provided with a first alignment layer, a top surface of which has a trench pattern having an extending direction as the same as that of the metal nanowires at the back side of the TFT glass substrate, the top surface of the first alignment layer has a plurality of regions provided with a plurality of trenches having an extending direction as the same as that of the metal nanowires in the first regions, and a plurality of regions provided with a plurality of trenches having an extending direction as the same as that of the metal nanowires in the second regions;

a color filter (CF) glass substrate, a back side of which has a plurality of third regions and a plurality of fourth regions that are interlaced with and parallel to each other, the third regions provided with a plurality of metal nanowires with a same pitch, extending along the second direction, the fourth regions provided with a plurality of metal nanowires with a same pitch, extending along the first direction; at a front side, the CF glass substrate provided with a second alignment layer, a top surface of which has a trench pattern having an extending direction as the same as that of the metal nanowires at the back side of the CF glass substrate, the top surface of the second alignment layer has a plurality of regions provided with a plurality of trenches having an extending direction as the same as that of the metal nanowires in the third regions, and a plurality of regions provided with a plurality of trenches having an extending direction as the same as that of the metal nanowires in the fourth regions, wherein the front side of the CF glass substrate is disposed opposite to the front side of the TFT glass substrate such that the first regions correspond to the third regions and the second regions correspond to the fourth regions;

a liquid crystal layer, disposed between the TFT glass substrate and the CF glass substrate; and a λ/b 4 phase retarder, attached to the metal nanowires at the back side of the CF glass substrate, where λ is the wavelength of light passing through the 3D display device, wherein the material of the metal nanowires in the first regions, the second regions, the third regions and the fourth regions is aluminum, silver or copper, wherein the width of the metal nanowires in the first regions, the second regions, the third regions and the fourth regions ranges from 100 to 300 nm, wherein the pitch of the metal nanowires in the first regions, the second regions, the third regions and the fourth regions ranges from 100 to 300 nm, wherein the thickness of the metal nanowires in the first regions, the second regions, the third regions and the fourth regions ranges from 20 to 500 nm.

2. A 3D display device, comprising:

a thin-film transistor (TFT) glass substrate, a back side of which has a plurality of first regions and a plurality of second regions that are interlaced with and parallel to each other, the first regions provided with a plurality of metal nanowires with a same pitch, extending along a first direction, the second regions provided with a plurality of metal nanowires with a same pitch, extending along a second direction, the first direction perpendicular to the second direction; at a front side, the TFT glass substrate provided with a first alignment layer, a top surface of which has a trench pattern having an extending direction as the same as that of the metal nanowires at the back side of the TFT glass substrate, the top surface of the first alignment layer has a plurality of regions provided with a plurality of trenches having an extending direction as the same as that of the metal nanowires in the first regions, and a plurality of regions provided with a plurality of trenches having an extending direction as the same as that of the metal nanowires in the second regions;

a color filter (CF) glass substrate, a back side of which has a plurality of third regions and a plurality of fourth regions that are interlaced with and parallel to each other, the third regions provided with a plurality of metal nanowires with a same pitch, extending along the second direction, the fourth regions provided with a plurality of metal nanowires with a same pitch, extending along the first direction; at a front side, the CF glass substrate provided with a second alignment layer, a top surface of which has a trench pattern having an extending direction as the same as that of the metal nanowires at the back side of the CF glass substrate, the top surface of the second alignment layer has a plurality of regions provided with a plurality of trenches having an extending direction as the same as that of the metal nanowires in the third regions, and a plurality of regions provided with a plurality of trenches having an extending direction as the same as that of the metal nanowires in the fourth regions, wherein the front side of the CF glass substrate is disposed opposite to the front side of the TFT glass substrate such that the first regions correspond to the third regions and the second regions correspond to the fourth regions;

a liquid crystal layer, disposed between the TFT glass substrate and the CF glass substrate; and a λ/4 phase retarder, attached to the metal nanowires at the back side of the CF glass substrate, where λ is the wavelength of light passing through the 3D display device, wherein the material of the metal nanowires in the first regions, the second regions, the third regions and the fourth regions is aluminum, silver or copper.

3. The 3D display device according to claim 2, wherein the width of the metal nanowires in the first regions, the second regions, the third regions and the fourth regions ranges from 100 to 300 nm.

4. The 3D display device according to claim 2, wherein the pitch of the metal nanowires in the first regions, the second regions, the third regions and the fourth regions ranges from 100 to 300 nm.

5. The 3D display device according to claim 2, wherein the thickness of the metal nanowires in the first regions, the second regions, the third regions and the fourth regions ranges from 20 to 500 nm.

6. A method for manufacturing a 3D display device, comprising:

providing a thin-film transistor (TFT) glass substrate, a back side of which has a plurality of first regions and a plurality of second regions that are interlaced with and parallel to each other;

forming a plurality of metal nanowires with a same pitch, extending along a first direction, in the first regions, and forming a plurality of metal nanowires with a same pitch, extending along a second direction, in the second regions, the first direction perpendicular to the second direction;

forming a first alignment layer at a front side of the TFT glass substrate, a top surface of the first alignment layer having a trench pattern having an extending direction as the same as that of the metal nanowires at the back side of the TFT glass substrate, the top surface of the first alignment layer has a plurality of regions provided with a plurality of trenches having an extending direction as the same as that of the metal nanowires in the first regions, and a plurality of regions provided with a plurality of trenches having an extending direction as the same as that of the metal nanowires in the second regions;

providing a color filter (CF) glass substrate, a back side of which has a plurality of third regions and a plurality of fourth regions that are interlaced with and parallel to each other;

forming a plurality of metal nanowires with a same pitch, extending along the second direction, in the third regions, and forming a plurality of metal nanowires with a same pitch, extending along the first direction, in the fourth regions;

forming a second alignment layer at a front side of the CF glass substrate, a top surface of the second alignment layer having a trench pattern having an extending direction as the same as that of the metal nanowires at the back side of the CF glass substrate, the top surface of the second alignment layer has a plurality of regions provided with a plurality of trenches having an extending direction as the same as that of the metal nanowires in the third regions, and a plurality of regions provided with a plurality of trenches having an extending direction as the same as that of the metal nanowires in the fourth regions;

attaching the CF glass substrate to the TFT glass substrate such that the front side of the CF glass substrate is opposite to the front side of the TFT glass substrate, and the first regions correspond to the third regions and the second regions correspond to the fourth regions;

disposing a liquid crystal layer between the TFT glass substrate and the CF glass substrate; and attaching a λ/4 phase retarder to the metal nanowires at the back side of the CF glass substrate, where λ is the wavelength of light passing through the 3D display device.

7. The method according to claim 6, wherein the material of the metal nanowires in the first regions, the second regions, the third regions and the fourth regions is aluminum, silver or copper.

8. The method according to claim 6, wherein the width of the metal nanowires in the first regions, the second regions, the third regions and the fourth regions ranges from 100 to 300 nm.

9. The method according to claim 6, wherein the pitch of the metal nanowires in the first regions, the second regions, the third regions and the fourth regions ranges from 100 to 300 nm.

10. The method according to claim 6, wherein the thickness of the metal nanowires in the first regions, the second regions, the third regions and the fourth regions ranges from 20 to 500 nm.

\* \* \* \* \*